United States Patent
Abouelleil et al.

(10) Patent No.: US 10,808,850 B2
(45) Date of Patent: Oct. 20, 2020

(54) PRESSURE ENERGIZED SEAT FOR PLUG VALVE

(71) Applicant: Mueller International, LLC, Atlanta, GA (US)

(72) Inventors: Ashraf Abouelleil, Oswego, IL (US); Steve Sharp, Naperville, IL (US); Vadim Lorman, Skokie, IL (US)

(73) Assignee: Mueller International, LLC, Atlanta, GA (US)

( * ) Notice: Subject to any disclaimer, the term of this patent is extended or adjusted under 35 U.S.C. 154(b) by 71 days.

(21) Appl. No.: 16/167,908

(22) Filed: Oct. 23, 2018

(65) Prior Publication Data

US 2020/0124189 A1    Apr. 23, 2020

(51) Int. Cl.
*F16K 5/18*    (2006.01)
*F16K 5/04*    (2006.01)

(52) U.S. Cl.
CPC ............ *F16K 5/188* (2013.01); *F16K 5/0407* (2013.01); *F16K 5/0478* (2013.01)

(58) Field of Classification Search
CPC .......... F16K 5/04; F16K 5/0407; F16K 5/045; F16K 5/0471; F16K 5/0478; F16K 5/18; F16K 5/184; F16K 5/188
See application file for complete search history.

(56) References Cited

U.S. PATENT DOCUMENTS

| | | | |
|---|---|---|---|
| 1,951,878 A * | 3/1934 | Lundgren | F16K 5/184 251/203 |
| 2,097,285 A * | 10/1937 | Lundgren | F16K 5/184 251/158 |
| 2,803,426 A * | 8/1957 | De Zurik | D21G 9/00 251/301 |
| 3,052,478 A * | 9/1962 | Horvereid | F16J 15/32 277/394 |
| 3,064,940 A * | 11/1962 | Anderson | F16K 5/045 251/249.5 |
| 3,254,872 A * | 6/1966 | Roos | F16K 5/184 251/163 |
| 3,314,645 A * | 4/1967 | Temple | F16K 5/184 251/317 |
| 3,379,408 A * | 4/1968 | Lowrey | F16K 5/0684 251/298 |

(Continued)

OTHER PUBLICATIONS

Henry Pratt Company; Drawing for 14 inch Plug Valve, Flanged, publicly available prior to Oct. 23, 2017, 1 pg.

(Continued)

*Primary Examiner* — David Colon-Morales
(74) *Attorney, Agent, or Firm* — Taylor English Duma LLP (57) ABSTRACT

A plug valve includes a valve body defining an inlet, an outlet, an interior surface, and an interior cavity extending from the inlet to the outlet, the interior surface defining the interior cavity, the interior surface including a seat proximate to a one of the inlet and the outlet, the seat defining a seat surface; and a valve plug positioned inside the interior cavity and configured to rotate inside the interior cavity between an open position of the valve and a closed position of the valve, the valve plug including a ridge, the ridge defining a radially outermost portion of the valve plug with respect to the axis of the valve, the valve plug contacting the seat of the valve body in the closed position of the valve.

20 Claims, 10 Drawing Sheets

(56) References Cited

U.S. PATENT DOCUMENTS

| | | | | |
|---|---|---|---|---|
| 3,472,523 A * | 10/1969 | Carlson, Jr. | ............ | F16J 15/106 277/649 |
| 3,486,736 A * | 12/1969 | Scaramucci | .......... | F16K 5/0668 251/315.14 |
| 3,617,027 A * | 11/1971 | Scaramucci | .......... | F16K 5/0668 251/315.01 |
| 4,635,674 A * | 1/1987 | Bajka | ...................... | F16K 5/225 137/246.22 |
| 4,640,492 A * | 2/1987 | Carlson, Jr. | ............. | F16K 25/00 251/163 |
| 4,697,786 A * | 10/1987 | Kennedy | ................... | F16K 1/24 251/309 |
| 4,844,413 A * | 7/1989 | Weber | ................... | F16K 5/0478 251/314 |
| 4,887,629 A * | 12/1989 | Wilson | ................. | F16K 27/065 137/15.24 |
| 5,934,645 A * | 8/1999 | Calvin | ................. | F16K 5/0657 251/175 |
| 5,947,443 A * | 9/1999 | Shellenbarger | ....... | F16K 5/0478 251/181 |
| 6,202,983 B1 * | 3/2001 | Hartman | ................ | F16J 15/061 137/15.18 |
| 6,264,206 B1 * | 7/2001 | Hashizawa | ............ | F16J 15/061 277/641 |
| 7,032,880 B2 * | 4/2006 | Scaramucci | .......... | F16K 5/0673 251/172 |
| 7,770,867 B2 * | 8/2010 | Libke | .................... | F16K 5/0407 251/209 |
| 9,441,740 B2 | 9/2016 | Kennedy | | |
| 9,976,657 B2 * | 5/2018 | Wolf | .................... | F16J 15/3232 |

OTHER PUBLICATIONS

Henry Pratt Company; Drawing for Plug Valve—Mechanical Joint Ends, publicly available prior to Oct. 23, 2017, 1 pg.
Henry Pratt Company; Maintenance Manual for Ballcentric Plug Valve, Feb. 2017, 10 pgs.
Henry Pratt Company; Specifications for Plug Valve, Sep. 2016, 1 pg.
Milliken; Brochure for Millcentric Full/100% Port Eccentric Plug Valve, published Mar. 2017, 8 pgs.
Milliken; Brochure for Millcentric Plug Valve, Mar. 2017, 24 pgs.
Milliken; Brochure for ½"-2" Millcentric Eccentric Plug Valve, Mar. 2017, 8 pgs.

* cited by examiner

PRESSURE ENERGIZED SEAT FOR PLUG VALVE

TECHNICAL FIELD

Field of Use

This disclosure relates to fluid valves. More specifically, this disclosure relates to fluid valves comprising a valve element defining ridges on a face surface.

Related Art

Certain types of valves, such as a plug valve in a fluid system, can comprise a valve shaft to actuate a mechanism for opening and closing the valve or otherwise adjusting a flow rate through the valve. A mechanism for actuating a valve can comprise, for example, a valve plug. For a plug valve, opening and closing the valve can comprise rotating the valve plug. To prevent leakage of the valve, various structures and methods have been used to seal the interface between moving parts of the valve such as, for example and without limitation, the valve plug and stationary parts of the valve such as the valve body, which can define a seat. Leakage from the valve can result in problems such as, for example and without limitation, costly repairs of the fluid system, contamination of surrounding air and soil, or even dangerous conditions for people nearby.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a plug valve comprising: a valve body defining an inlet, an outlet, an interior surface, and an interior cavity extending from the inlet to the outlet, the interior surface defining the interior cavity, the interior surface comprising a seat proximate to a one of the inlet and the outlet, the seat defining a seat surface; and a valve plug positioned inside the interior cavity and configured to rotate inside the interior cavity between an open position of the valve and a closed position of the valve, the valve plug comprising a ridge, the ridge defining a radially outermost portion of the valve plug with respect to the axis of the valve, the valve plug contacting the seat of the valve body in the closed position of the valve.

In a further aspect, disclosed is a valve plug comprising: a shaft defining a shaft axis; and a web extending from the shaft at least partly in a first direction parallel to the shaft axis and in a second direction orthogonal to the shaft axis, the web being C-shaped, each of a radially outer surface and a radially innermost surface of the web offset from the shaft axis at a midpoint of the web, a ridge extending from the radially outer surface of the web, the web configured to block passage of a fluid through a valve in a closed position of the valve.

In yet another aspect, disclosed is a method of using a valve, the method comprising: rotating a valve plug of the valve inside a valve body of the valve, the valve body defining an inlet, an outlet, an interior surface, and an interior cavity extending from the inlet to the outlet, the interior surface defining the interior cavity, the interior surface comprising a seat proximate to a one of the inlet and the outlet; and contacting the seat of the valve body with the valve plug, the valve plug comprising a ridge extending radially outward with respect to an axis of the valve, the valve plug contacting the seat of the valve body in a closed position of the valve.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that end of the valve nearest to an inlet of the valve; "rear" is that end of the valve that is opposite or distal the front; "left" is that which is to the left of or facing left from a person looking down a main through axis of the valve from the front; and "right" is that which is to the right of or facing right from that same person. "Horizontal" or "horizontal orientation" describes that which is in a plane extending from left to right and aligned with the horizon. "Vertical" or "vertical orientation" describes that which is in a plane that is angled at 90 degrees to the horizontal.

In one aspect, a pressure energized seat for a plug valve and associated methods, systems, devices, and various apparatuses are disclosed herein. In one aspect, a plug of the plug valve can comprise a web defining ridges on a radially outer surface.

Figure 1:
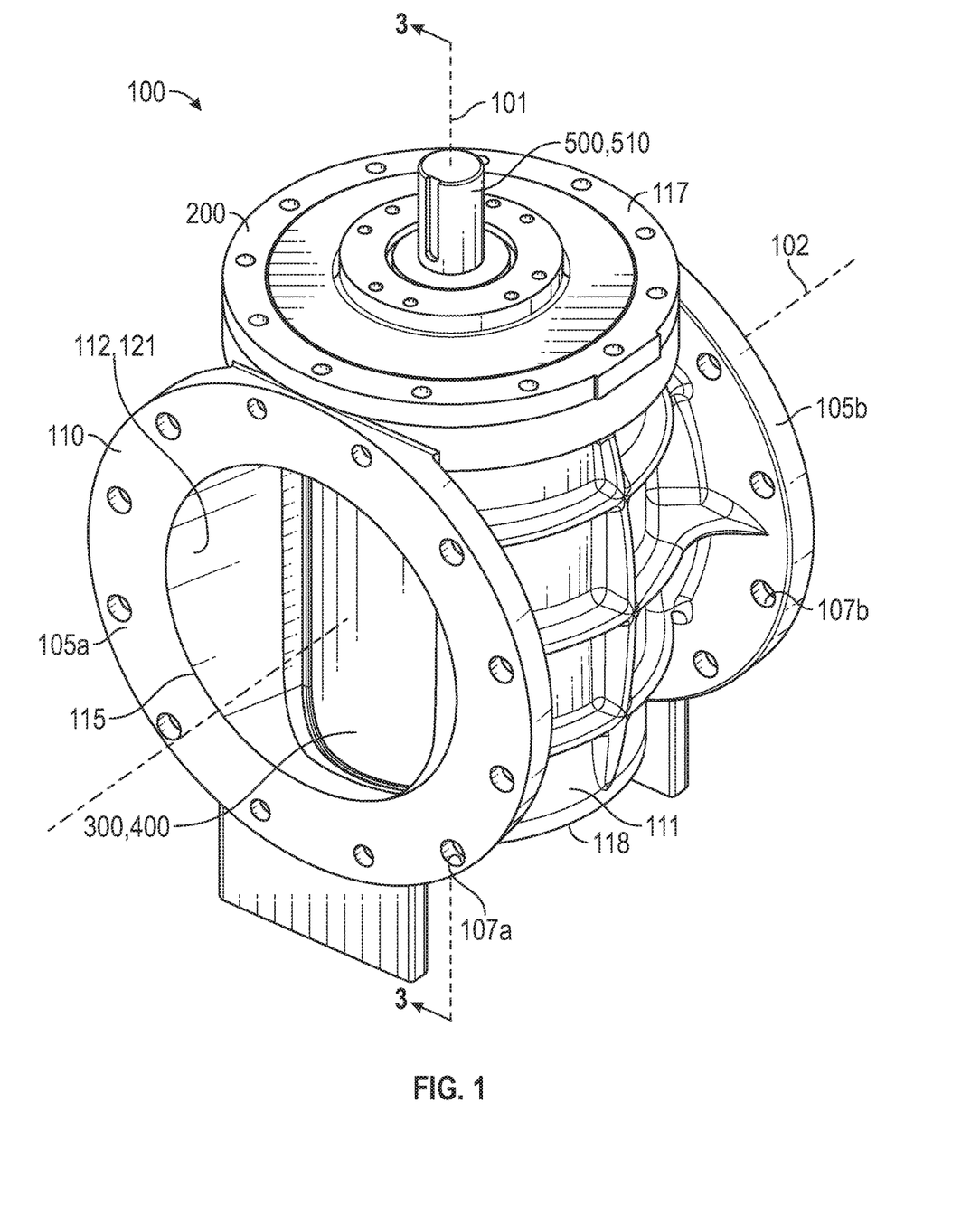
FIG. 1 is a front top perspective view of a plug valve in accordance with one aspect of the current disclosure.

As shown in FIG. 1, a valve 100 can comprise a valve body 110 and a valve plug 300. In some aspects, the valve 100 can be a plug valve such as the BALLCENTRIC® plug valve manufactured by Henry Pratt Company, LLC, of Aurora, Ill. In other aspects, the valve 100 can be one of various other types of valves such as, for example and without limitation, another type of plug valve or a cone valve. The fluid itself can be any one of a number of different fluid media including a gas such as air or a liquid such as water. The fluid can be flammable, non-flammable, explosive, or non-explosive.

Figure 13:
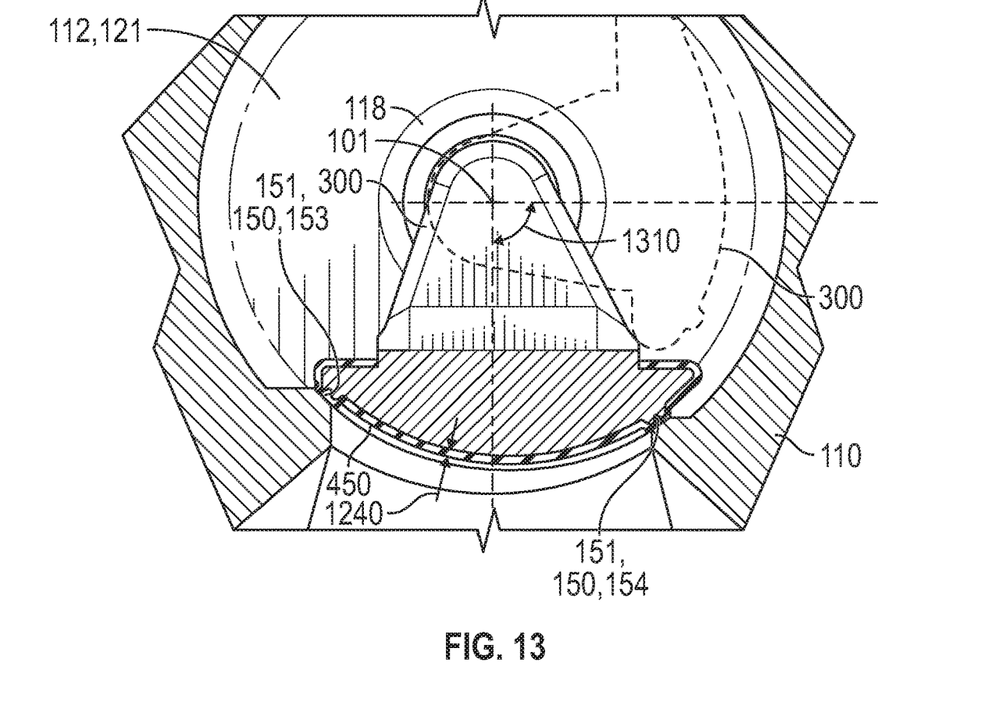
FIG. 13 is a top sectional view of the plug valve of FIG. 1 with the plug valve in a closed position.
Figure 14:
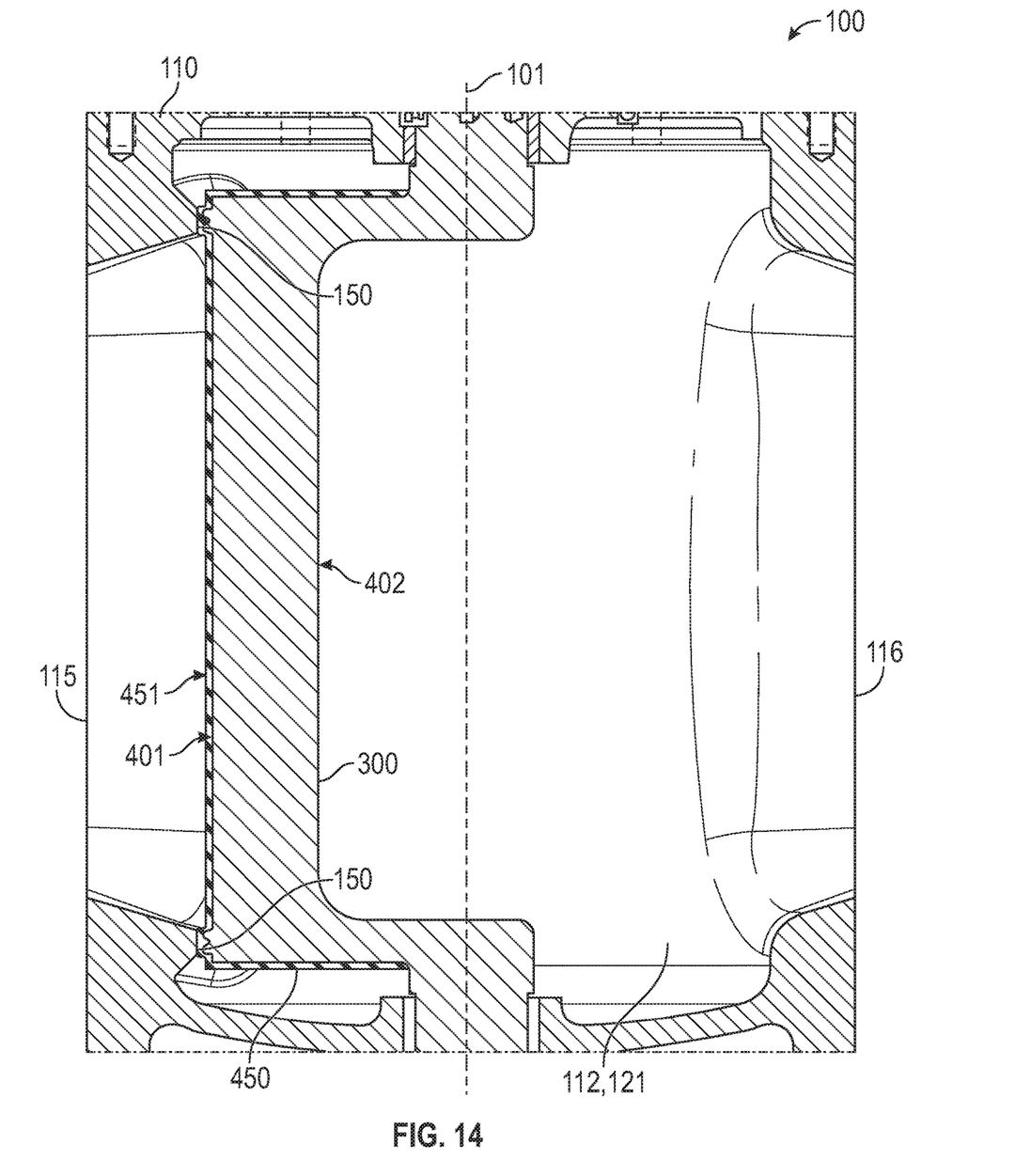
FIG. 14 is a side sectional view of the plug valve of FIG. 1 taken from detail 14 of FIG. 3.
Figure 15:
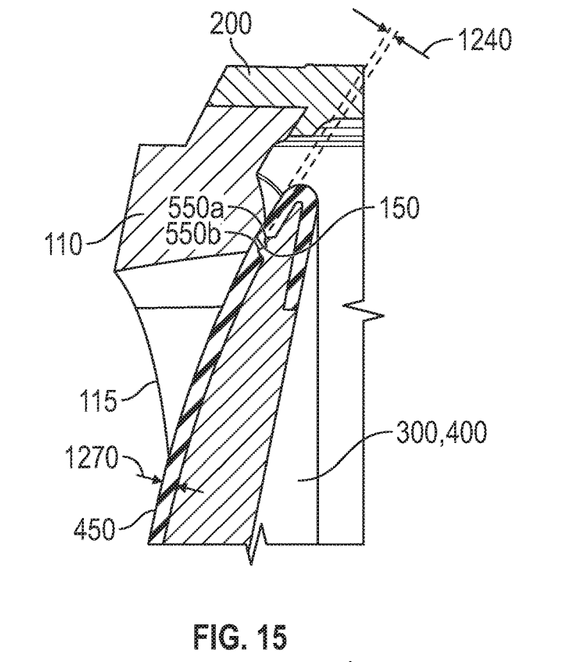
FIG. 15 is a sectional view of the plug valve of FIG. 1 proximate to a top end of the plug valve in accordance with another aspect of the current disclosure.
Figure 16:
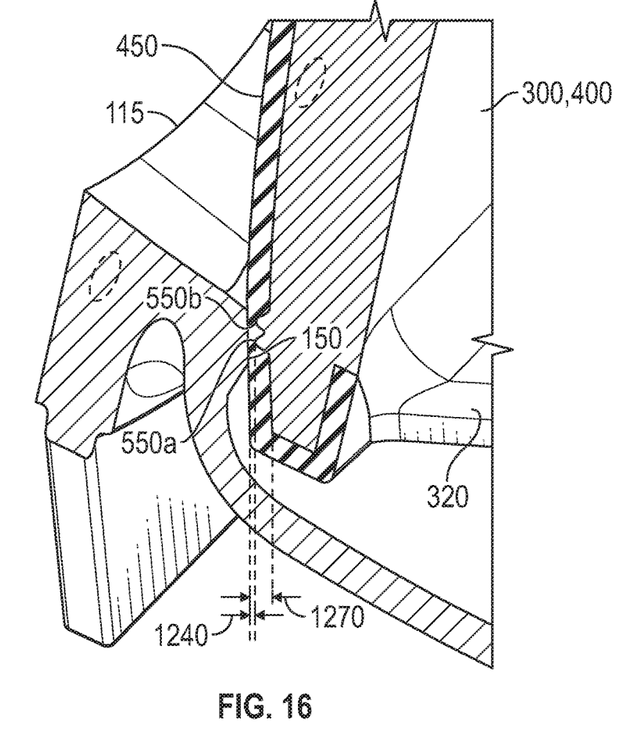
FIG. 16 is a sectional view of the plug valve of FIG. 15 proximate to a bottom end of the plug valve.

In some aspects, as shown in FIG. 13, the valve plug 300 of the valve 100 can be configured to rotate a quarter of a turn or 90 degrees between a fully open position and a fully closed position. In a typical plug valve such as the valve 100, a portion of the valve plug 300 can be configured to remain in the path of the fluid traveling through the valve 100 even when the valve 100 is open. In other aspects, the type of valve, the rotation angle or rotation angle range, or the particular valve configuration can differ from that described herein and shown in the figures.

The valve body 110 can define an inlet 115, an outlet 116 (shown in FIG. 2) distal from the inlet 115, a top end 117, a bottom end 118 distal from the top end 117, an interior cavity 121 defined between the inlet 115 and the outlet 116 and defining a fluid bore, and a shaft bore 123 (shown in FIG. 2) defined in the top end 117 and the bottom end 118. In some aspects, the shaft bore 123 can comprise a first portion 124 (shown in FIG. 2) defined in the top end 117 of the valve body 110 and a second portion 125 (shown in FIG. 3) defined in the bottom end 118 of the valve body 110. In some aspects, the interior cavity 121 and the shaft bore 123 can be cylindrical in shape.

As shown, the valve body 110 can comprise a cap 200. As will be described in more detail below, the valve plug 300 can comprise a web 400 and a shaft 500 about which the web 400 can be configured to rotate. In some aspects, the shaft 500 can comprise an upper shaft 510 and a lower shaft 520 (shown in FIG. 2). The shaft bore 123 of the valve body 110 and the shaft 500 can be aligned along a shaft axis 101 during assembly of the valve 100. The valve 100 can further define a fluid bore axis or main axis 102 extending from the inlet 115, through the fluid bore, to the outlet 116.

In some aspects, as shown, the valve body 110 can be a "flanged" type valve body comprising an attachment flange 105a,b on each axial end of the valve 100—relative to the main axis 102 and proximate to the inlet 115 and the outlet 116—for attaching the valve to a piping system. Each of the attachment flanges 105a,b can respectively define a plurality of attachment holes 107a,b through which a plurality of fasteners, including but not limited to nuts and bolts, can secure the valve 100 to the piping system. The valve body 110 may also be constructed as, for example and without limitation, a "lugged" type, a "wafer" type, or a "butt-weld" type valve. A "lugged" type valve typically comprises multiple lugs through which a plurality of fasteners can secure the valve 100 to the piping system, and a "wafer" type valve typically comprises neither lugs nor attachment flanges but is sandwiched between opposing flanges on the adjacent piping components of the piping system in which it is installed. A "butt-weld" type valve typically does not require fasteners for assembly to the piping system but is instead welded in place.

The valve body 110 can further comprise an outer surface 111 and an inner surface 112, which can define the interior cavity 121. In some aspects, the valve 100 can comprise a liner (not shown) lining the interior cavity 121 of the valve body 110 and extending from the inlet 115 to the outlet 116. The valve 100 can comprise a seat 150 (shown in FIG. 2) against which the valve plug 300 can seal. The seat 150 can be disposed proximate to a one of the inlet 115 and the outlet 116. The seat 150 define a seat surface 151 (shown in FIG. 2).

In some aspects, the valve body 110 can be cast from any one or more of a number of different metals or metal alloys including, for example and without limitation, stainless steel, carbon steel, ductile iron, and various steel and non-steel alloys including INCOLLOY alloys, MONEL alloys, HASTELLOY alloys, INCONEL alloys, and chrome moly alloys. The valve body 110 can also be machined. In other aspects, any component of the valve 100 such as, for example and without limitation, the valve body 110 can be formed using an additive manufacturing method such as used in a three-dimensional printing process.

Figure 2:
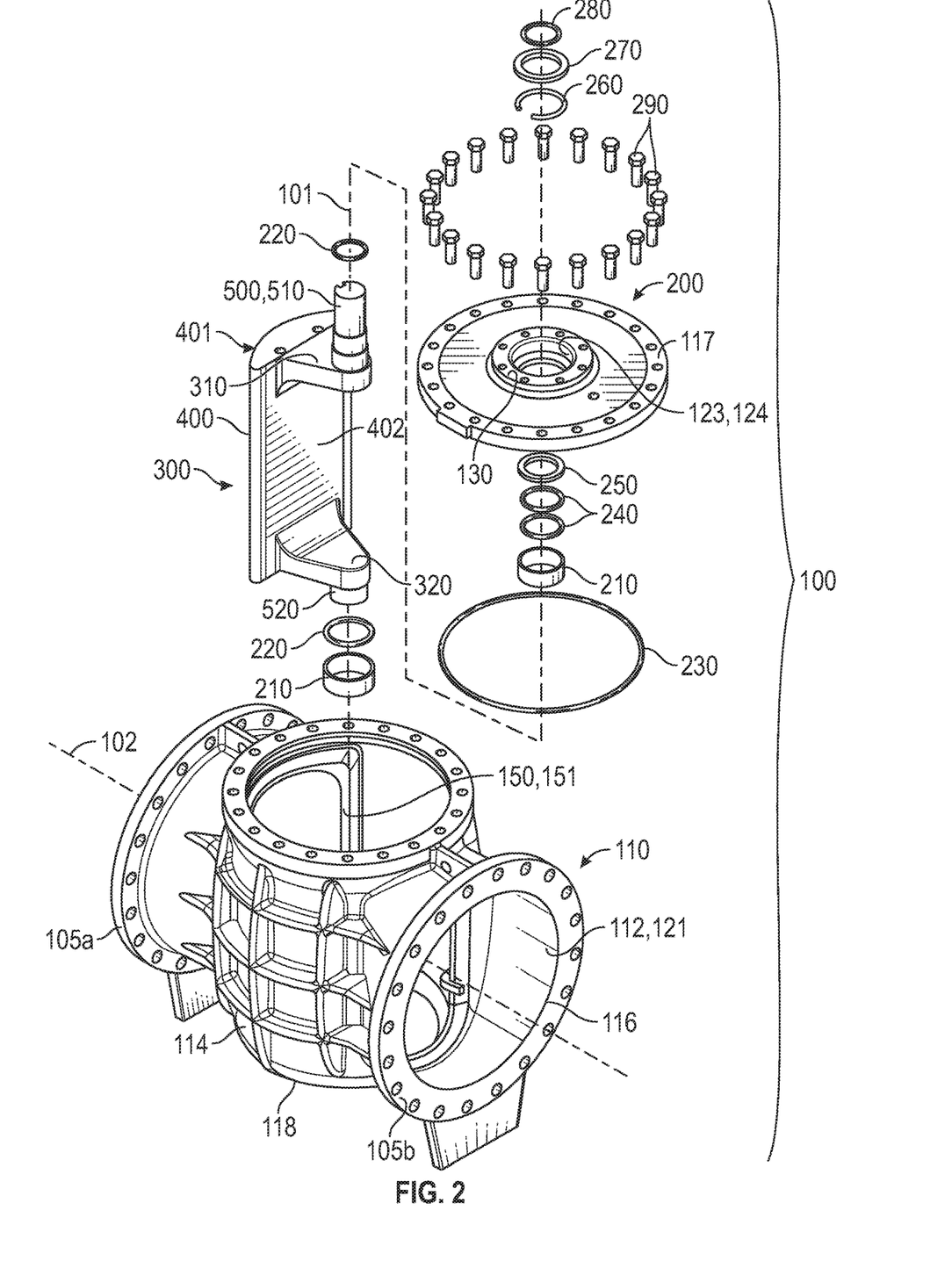
FIG. 2 is a rear top exploded perspective view of the plug valve of FIG. 1 comprising a valve body and a valve plug.

As shown in FIG. 2, the valve 100 can comprise a sleeve bearing 210, which can be installed inside the lower bore 125 of the shaft bore 123 of the valve body 110 and can be sized to receive the lower shaft 520 of the valve plug 300. The valve 100 can further comprise a grit seal or washer 220, which can either comprise or else be formed entirely from a low-friction material such as, for example and without limitation, polytetrafluoroethylene (PTFE). In some aspects, the washer 220 can be positioned proximate to and about the lower shaft 520 of the valve plug 300. In other aspects, the washer 220 can be positioned proximate to and about the upper shaft 510 of the valve plug 300. In other aspects, separate washers 220 can be positioned proximate to and about each of the upper shaft 510 and the lower shaft 520 of the valve plug 300.

Proximate to the top end 117 of the valve 100, the cap 200 can be sealed to a main portion 114 of the valve body 110 with an O-ring 230. The upper shaft 510 of the valve plug 300 can be configured to extend through a second sleeve bearing 210, at least one "U" cup seal 240 (two of which are shown), a seal retaining ring 250, and the shaft bore 123, 124. Above the cap 200, the upper shaft 510 can extend through a first snap ring 260, which can be an internal snap ring, a support collar 270, and a second snap ring 280, which can also be an internal snap ring. The cap 200 can be secured to the main portion 114 of the valve body 110 with fasteners 290. Each of the sleeve bearing 210, the washers 220, the O-ring 230, the "U" cup seals 240, the seal retaining ring 250, the cap 200, the snap rings 260, 280, the support collar 270, the cap 200, the fasteners 290 or a pattern thereof can be aligned along the shaft axis 101.

As shown, the plug 300 can comprise the web 400, the upper shaft 510, and the lower shaft 520. In some aspects, the web 400 can be connected to the upper shaft 510 by an upper yoke 310 and the web 400 can be connected to the lower shaft 520 by a lower yoke 320. Each yoke 310, 320 can be described as a trunnion. In other aspects, the web 400 can be connected directly to the upper shaft 510 and the lower shaft 520. In some aspects, as shown, a radially outer surface 401, which can also be described as a face surface, of the web 400 can be radiused in at least one direction. In other aspects, the radially outer surface 401 of the web 400 can be radiused in more than one direction. In some aspects, as shown, a radially inner surface 402 can be flat. In other aspects, the radially inner surface 402 can be curved. Either or both of the upper shaft 510 and the lower shaft 520 can vary in diameter to interface with and, as desired, be retained in position by the aforementioned valve components such as, for example and without limitation, the sleeve bearing 210 and the "U" cup seals 240.

Figure 3:
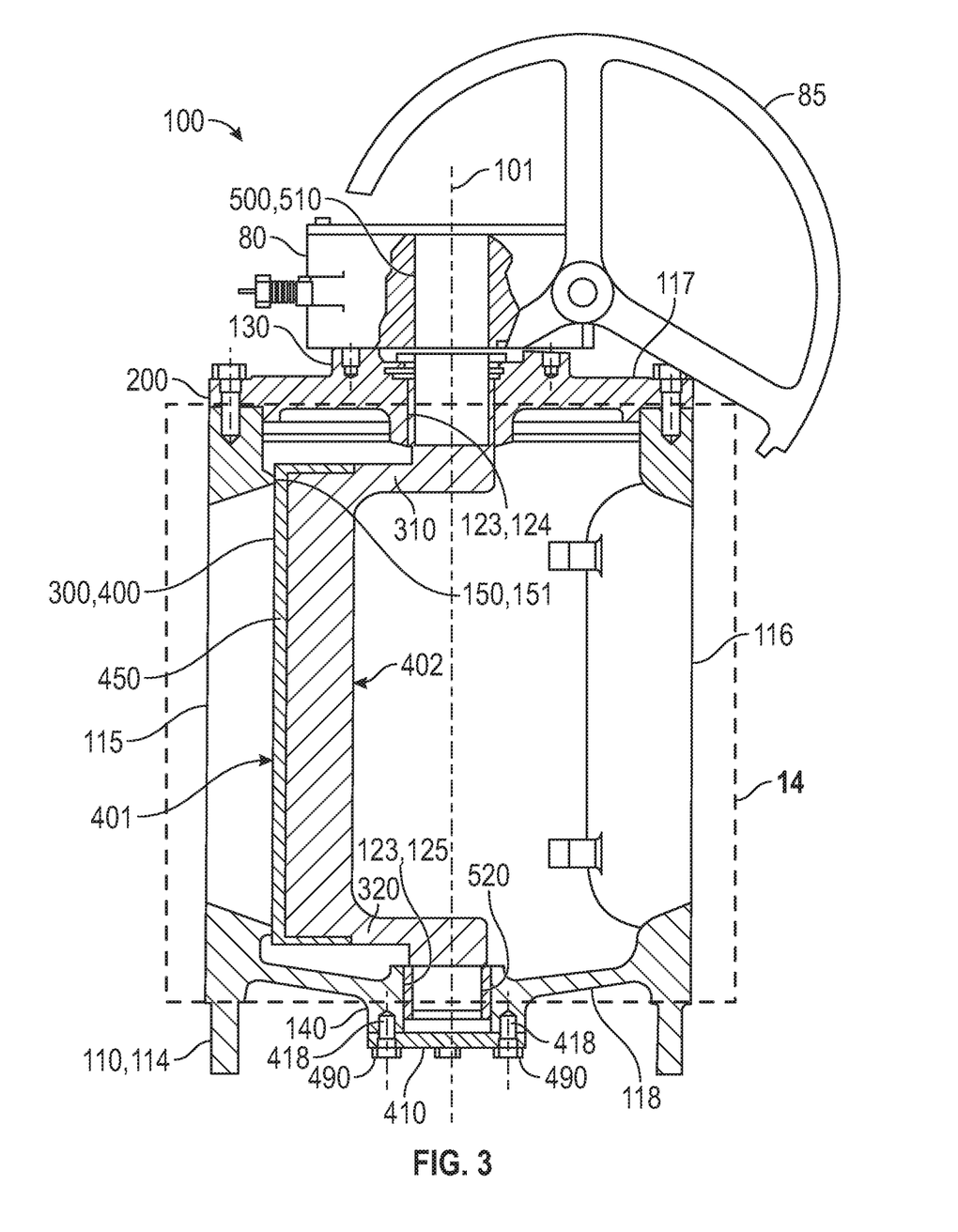
FIG. 3 is a sectional view of the plug valve of FIG. 1 taken along line 3-3 of FIG. 1.

In some aspects, as shown in FIG. 3, the valve 100 can further comprise an actuator 80 for opening the valve 100 to an open position or closing the valve 100 to a closed position or to otherwise the adjust the flow of fluid through the valve 100. The actuator 80 can be assembled to the top end 117 of the valve 100, which can be defined by a top trunnion 130 of the valve body 110. As shown, the top trunnion 130 can be defined by the cap 200. In some aspects, the actuator 80 can comprise either a handwheel operator 85 as shown, a lever operator (not shown), or a gear operator (not shown). In other aspects, the valve 100 can be made to open or close by pneumatic or electrical power or any other suitable method.

At the bottom end 118 of the valve 100, a bottom cover 410 can be assembled to a bottom trunnion 140 with a plurality of fasteners 490 extending through a plurality of attachment bores 418. In other aspects, the bottom cover 410 can be assembled to the bottom trunnion 140 by other methods, such as by a single fastener 490 or by welding.

In some aspects, as shown, the shafts 510, 520, the yokes 310, 320, and the web 400 of the plug 300 can be formed from a monolithic piece of material. In other aspects, any of the shafts 510, 520, the yokes 310, 320, and the web 400 of the plug 300 can be formed separately from the other components of the plug 300. In other aspects, any of the shafts 510, 520, the yokes 310, 320, and the web 400 of the plug 300 can be formed from a separate material. As shown, at least part of the plug 300 such as, for example and without limitation, the radially outer surface 401 can comprise a coating 450. The coating 450 can contact the seat surface 151 of the seat 150 of the valve body 110 in the closed position of the valve 100, which is the condition or state of the valve 100 shown in FIG. 3.

The coating 450 can comprise an elastomer material, in which case the coating 450 can be described as being an elastomer coating. The elastomer material can comprise any elastomeric material such as, for example and without limitation, Buna-N rubber (i.e., nitrile rubber or acrylonitrile butadiene rubber), ethylene propylene diene (EPDM) rubber, natural rubber, or silicone.

Figure 4:
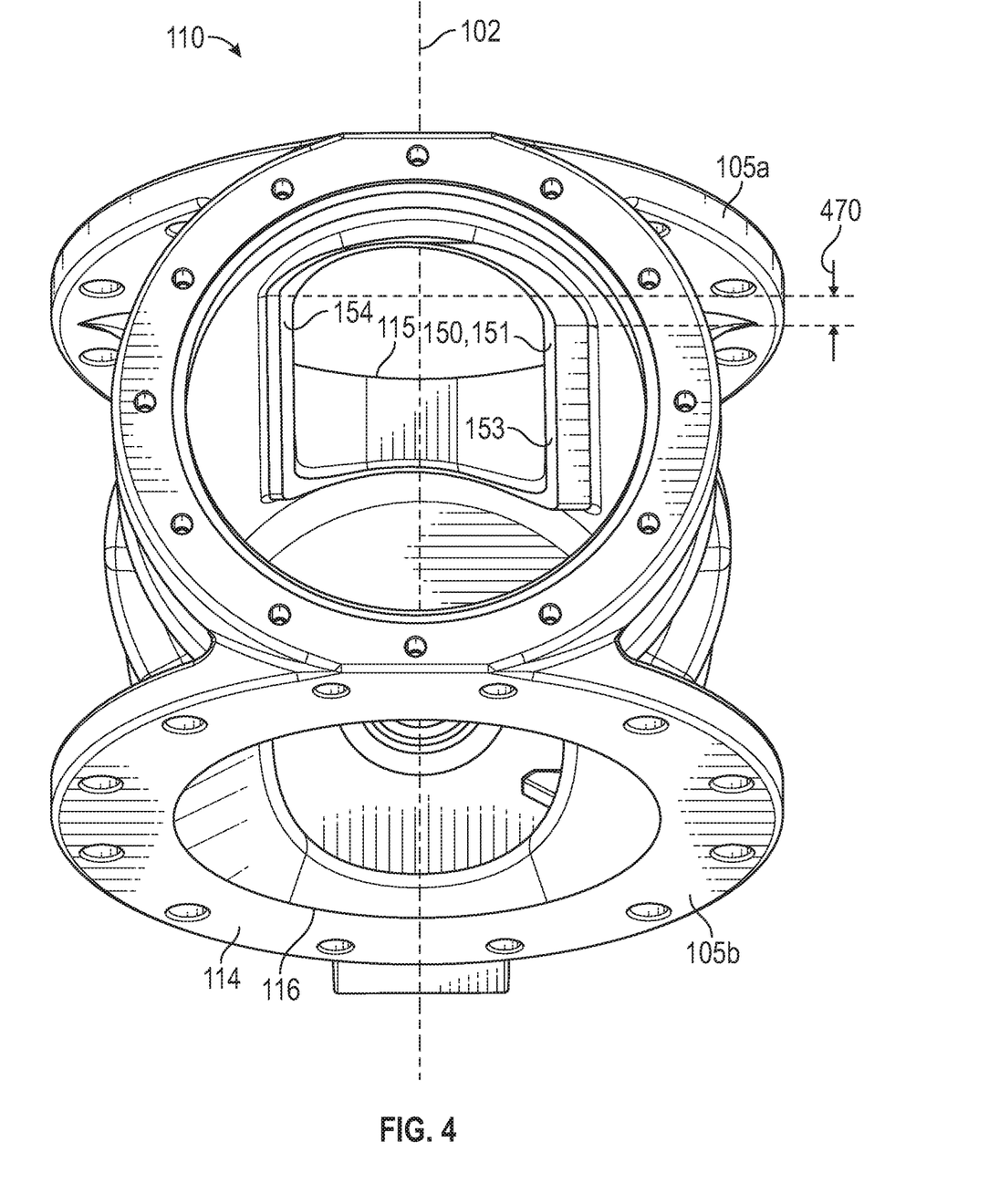
FIG. 4 is a top perspective view of the valve body of FIG. 2.

As shown in FIG. 4, in some aspects, the seat 150 can be asymmetric about the main axis 102 of the valve 100. For example and without limitation, an edge of a first side 153 of the seat 150 (which can be on a right side of the valve 100 when the valve 100 is viewed facing a rear of the valve 100 or the outlet 116 as shown) can be offset axially, i.e., in a direction along the main axis 102, from an edge of a second side 154 of the seat 150 (which can be a right side of the valve 100 when the valve 100 is viewed facing the front of the valve 100) by an offset distance 470. Likewise, the plug 300 can also be asymmetric about the main axis 102 when installed inside the valve body 110 and moved to the closed position. As will be described below, such asymmetric construction can facilitate improved sealing of the plug 300 against the seat 150 by creating a tighter seal upon rotation of the plug 300, while allowing the valve 100 to be opened with lower torque than would otherwise be required. Likewise, as will also be described, the coating 450 can also facilitate improved sealing of the plug 300 against the seat surface 151 of the seat 150.

Figure 5:
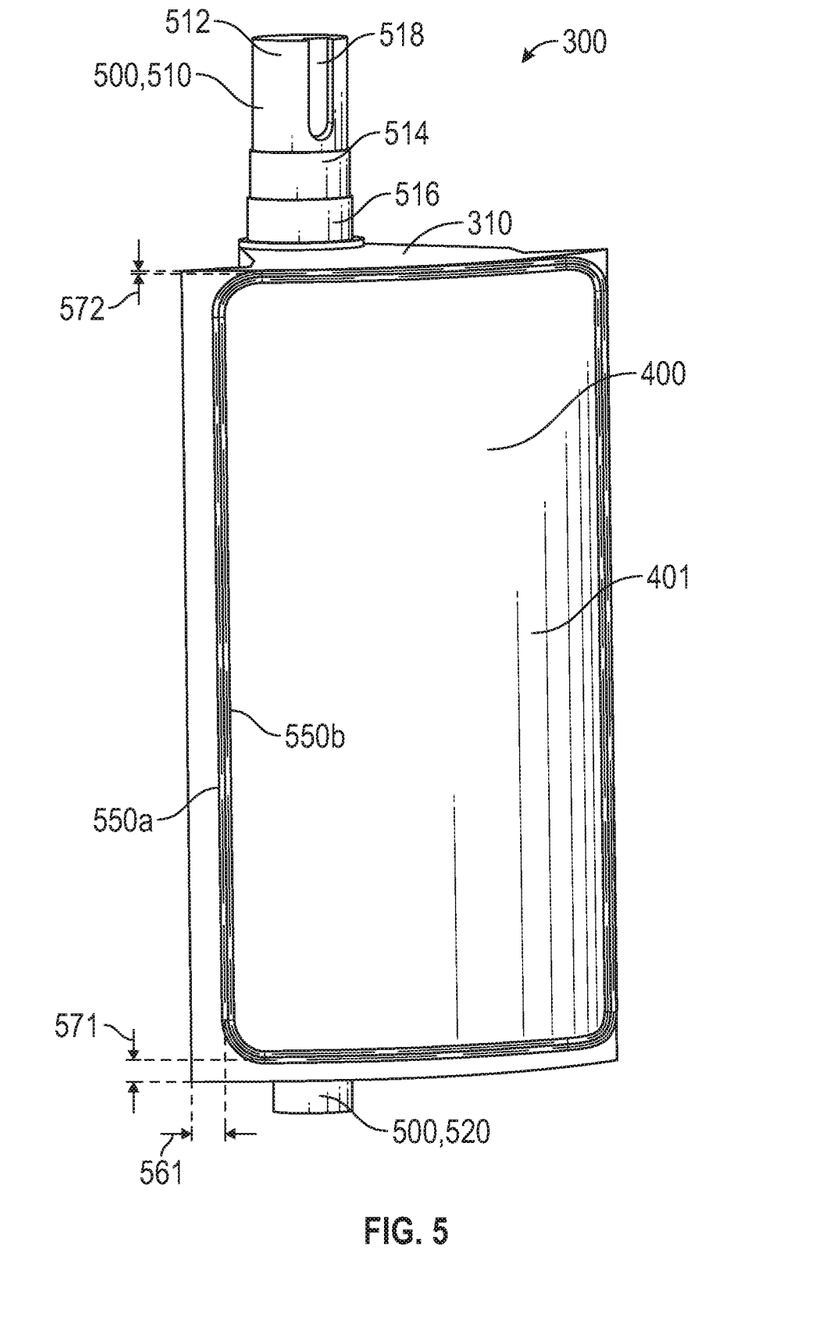
FIG. 5 is a side perspective view of the valve plug of FIG. 2.

As shown in FIG. 5, the plug 300 can comprise a pair of ridges 550a,b. As shown, the ridges 550a,b can extend from the web 400 of the plug 300 at least partly in a radial direction away from the shaft axis 101. In some aspects, the plug 300 can comprise a single first ridge 550a. In other aspects, that plug 300 can further comprise more than two ridges 550 or only a single ridge 550. Each of the ridges 550a,b can be positioned on the radially outer surface 401 of the web 400. The second ridge 550b can be positioned adjacent to the first ridge 550a on the valve plug 300 and can be positioned substantially parallel and concentric to the first ridge 550a on the web 400. A centerline or a peak of either of the ridges 550a,b can be offset from an edge of the web 400 by a horizontal offset distance 561, 562 (562 shown in FIG. 6) and a vertical offset distance 571, 572. In effect, the ridges 550 can be cast into the web 400 of the plug 300 in a position on a perimeter of the radially outer surface 401. The upper shaft 510 can comprise any one of a first portion 512, a second portion 514, and a third portion 516, each of which can have a different diameter as shown. The shaft 500 can further define a slot 518 in the upper shaft 510, such as for the purpose of engaging with the actuator 80.

Figure 6:
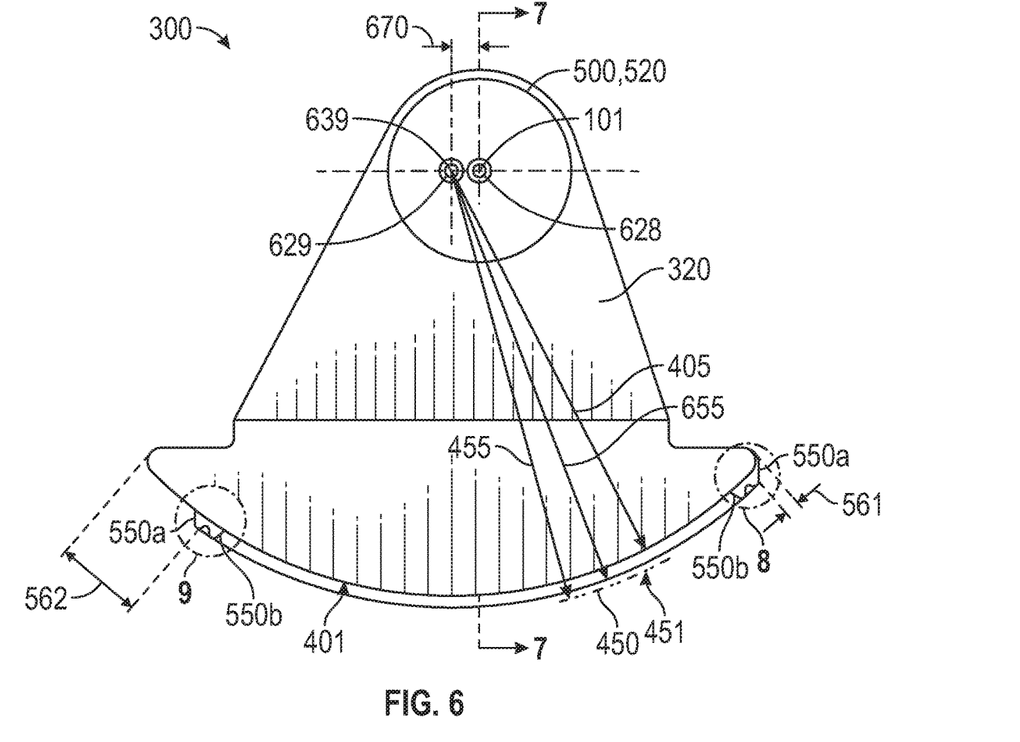
FIG. 6 is a bottom plan view of the valve plug of FIG. 5.

As shown in FIG. 6, the plug 300 can define a center hole 618, 628 (618 shown in FIG. 7) in the shafts 510, 520, respectively. The plug 300 can further define a offset hole 629 in the lower shaft 510 and a corresponding offset hole (not shown) in the upper shaft 510. Each of the center holes 618, 628 can be aligned with the shaft axis 101, while each of the offset holes, such as, for example and without limitation, the offset hole 629, can be offset in a radial direction relative to the shaft axis 101 from the center hole 618, 628 by an radial offset distance 670. As shown, the radially outer surface 401, the ridges 550a,b, and the coating 450 can in a cross-section of the plug 300 taken in a plane orthogonal to the shaft axis 101 define web radii 405, 655, 455, respectively, each of which can be measured relative to a web axis 639 defined by an offset hole such as the offset hole 629. As such, the coating 450 can comprise a coating surface 451 as shown that defines the radius 455 as being constant. In effect, the web axis 639 can be made equidistant from the tip of each portion of the ridge 550a,b and offset from the shaft axis 101. By so defining the web radii 405, 655, 455, the plug 300 can effectively be made "eccentric"—the web axis 639 being offset from the shaft axis 101 about which the plug 300 rotates—for quick and secure closure of the plug 300 against the seat 150 of the valve 100 during closing of the valve 100 as well as quick opening of the plug 300 and a lower operating torque.

For example and without limitation, the web radius 455, measured to the radially outer surface 401, can measure 5.750 inches (approximately 146.0 millimeters) for a particular valve 100 such as a 14 inch plug valve equivalent to a valve manufactured by Henry Pratt and having model number 601N1, and the web radius 655, measured to tips 555a,b of the respective ridges 550b, can measure 5.960 inches (approximately 151.4 millimeters).

Figure 7:
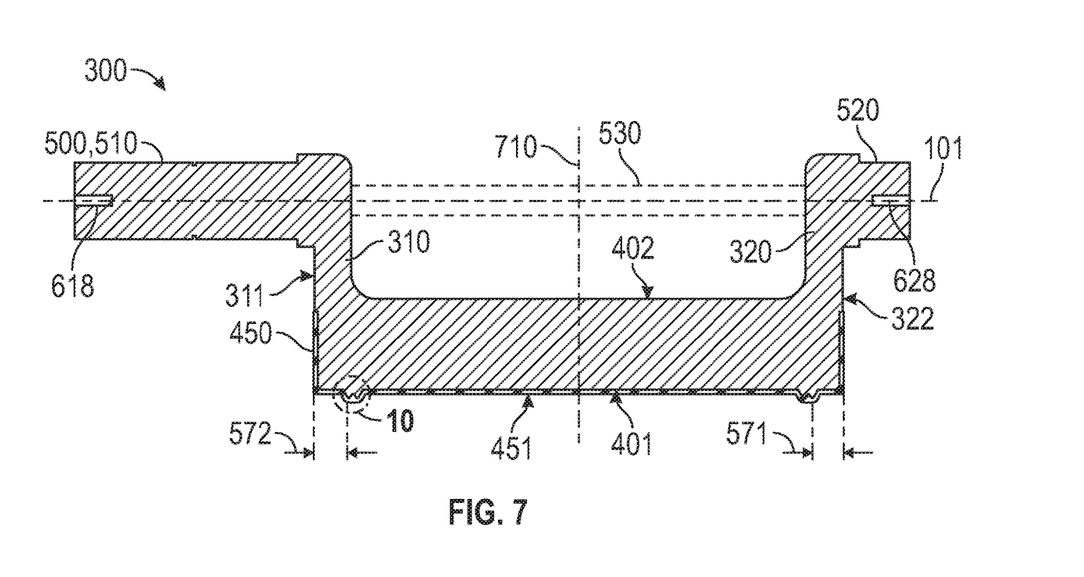
FIG. 7 is a sectional view of the valve plug of FIG. 5 taken along line 7-7 of FIG. 6.

As shown in FIG. 7, each of the upper shaft 510 and the lower shaft 520 can be aligned along the shaft axis 101. Either in cross-section or when viewed from the side, the plug 300—and, in some aspects, more specifically the web 400 and the yokes 310, 320 of the plug 300—can be C-shaped as shown. By being C-shaped, the web 400 can extend from the shaft 500 at least partly in a first direction parallel to the shaft axis 101 and in a second direction orthogonal to the shaft axis 101 so as to resemble the shape of the letter "C." Each of the radially outer surface 401 and the radially innermost surface 402 of the web 400 can be offset from the shaft axis 101 at a midpoint 710 of the web 400. During manufacturing of the plug 300, the plug 300 can be formed with a bar 530, which can facilitate proper casting of the plug 300 but can then be removed before final machining or other processing of the plug 300. As shown, the coating 450 can define the radially outer surface 401 and other surfaces of the plug 300 such as an axially facing surface 311, 322 of each of the respective yokes 310, 320. In some aspects, as shown in FIG. 6, the coating 450 can vary in thickness. In other aspects, as shown in FIG. 7, the coating 450 can be substantially constant in thickness by following the counter of the web 400 without the coating 450. In similar aspects, a thickness of the coating 450 can be thinner along the ridge 550a,b than at a position adjacent to the ridge 550a,b.

Figure 8:
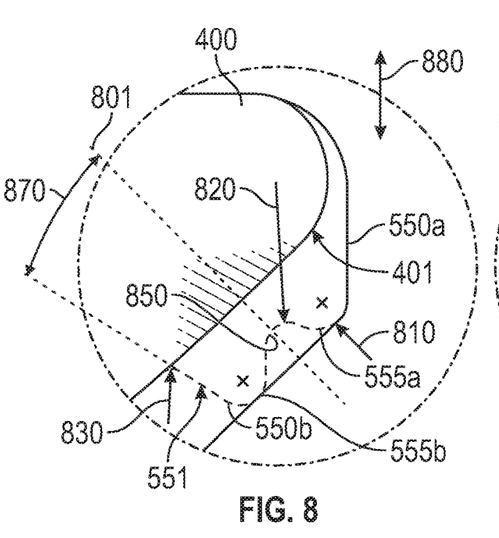
FIG. 8 is a detail view of ridges of the valve plug of FIG. 5 taken from detail 8 of FIG. 6.
Figure 9:
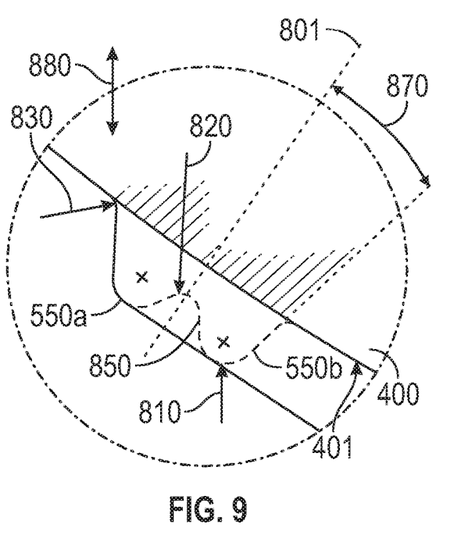
FIG. 9 is a detail view of the ridges of the valve plug of FIG. 5 taken from detail 9 of FIG. 6.

FIGS. 8-11 show certain aspects of the ridges 550a,b in greater detail but with the coating 450 removed for clarity. As shown in FIGS. 8 and 9, a respective tip 555a,b of each of the ridges 550a,b can be round in cross-section. More specifically, either of the tips 555a,b can define a radius 810. The radius 810 can measure, for example and without limitation, between 1 and 3 millimeters. The web 400 can further define a valley 850 between adjacent ridges such as the ridges 550a,b. The valley 850 can be round in cross-section and can more specifically define a radius 820. The valley 850 can further define a valley centerline 801, which can be substantially orthogonal to the radially outer surface 401 of the web 400. As shown, portions of an outer surface 551 of either of the ridges 550a,b can be angled with respect to the valley centerline 801 by an angle 870. In some aspects, the angle 870 can measure 15 degrees. In other aspects, the angle 870 can measure less than or greater than 15 degrees. A transition between the radially outer surface 401 and either of the ridges 550a,b can define a radius 830. As shown, the ridges 550a,b can have an asymmetric shape in cross-section. In some aspects, the shape of the ridges can be adjusted as shown—including the angle 870 on one side or another of the ridges 550a,b—to facilitate removal of the plug 300 in a demold direction 880 from a mold (not shown) in which the plug 300 can be molded or cast. Such removal can be facilitated by, for example and without limitation, the removal or reduction of "undercuts" that might otherwise be created by the ridges 550a,b,c when having a symmetrical shape in cross-section. Such adjustments can also explain at least in part why a portion of the ridge 550a in FIG. 8 extends past the edge of the radially outer surface 401 of the web 400.

Figure 10:
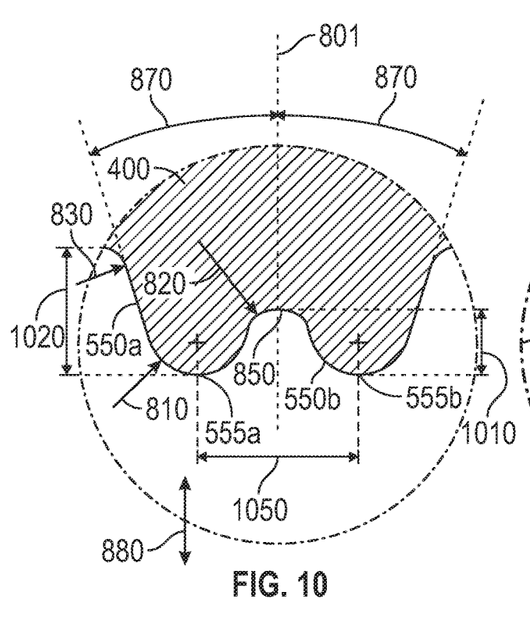
FIG. 10 is a detail view of the ridges of the valve plug of FIG. 5 taken from detail 10 of FIG. 7.

As shown in FIG. 10, a depth 1010 of the valley 850 defined between the first ridge 550a and the second ridge 550b can be or can measure less than a height 1020 of each of the first ridge 550a and the second ridge 550b. The ribs 550a,b, as measured between centerlines of each ridge 550a,b, which can coincide with the respective tips 555a,b of the corresponding ridges 550a,b, can be offset from each other by an offset distance 1050. The offset distance 1050 can measure, for example and without limitation, 0.3 inches (approximately 7.7 millimeters). As shown, the ridges 550a,b can have a symmetric shape in cross-section. In some aspects, by being tapered as shown, the ridges 550a,b can bear and distribute loads encountered during sealing of the plug 300 against the seat 150 of the valve 100 not unlike a sloped footing supporting a heavy structure can bear and distribute the weight of the structure. By distributing a load, a base of each of the ridges 550a,b can experience reduced stress, where stress is defined by force per unit area.

Figure 11:
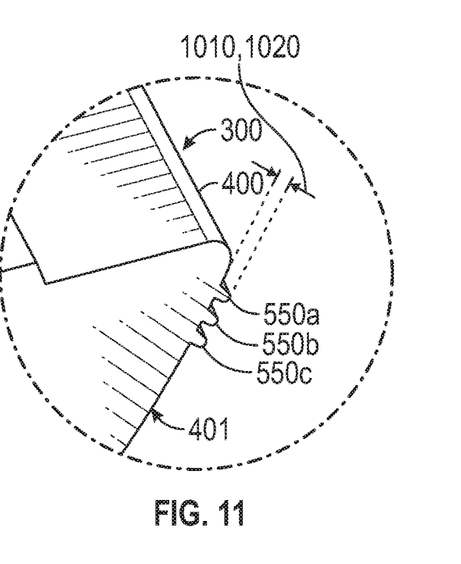
FIG. 11 is a bottom detail perspective view of the ridges of the valve plug of FIG. 5 in accordance with another aspect of the current disclosure.

As shown in FIG. 11, the plug 300 can further comprise a third ridge 550c. The third ridge 550c can be positioned adjacent to the second ridge 550b of the valve plug 300 by the offset distance 1050 (similarly as shown in FIG. 10). As shown, the depth 1010 of the valley 850 (shown in FIG. 10) can be substantially equal to the height 1020 of the ridges 500a,b,c. In some aspects, for a particular valve 100 such as the aforementioned Henry Pratt plug valve having model number 601N1, the height 1020 of the ridges 500a,b,c can be at least 0.13 inches (approximately 3.3 millimeters). In other aspects, the height 1020 of the ridges 500a,b,c can be at most 0.21 inches (approximately 5.3 millimeters). In other aspects, the height 1020 of the ridges 500a,b,c can be in a range between 0.13 inches (approximately 3.3 millimeters) and 0.21 inches (approximately 5.3 millimeters), inclusive.

Figure 12:
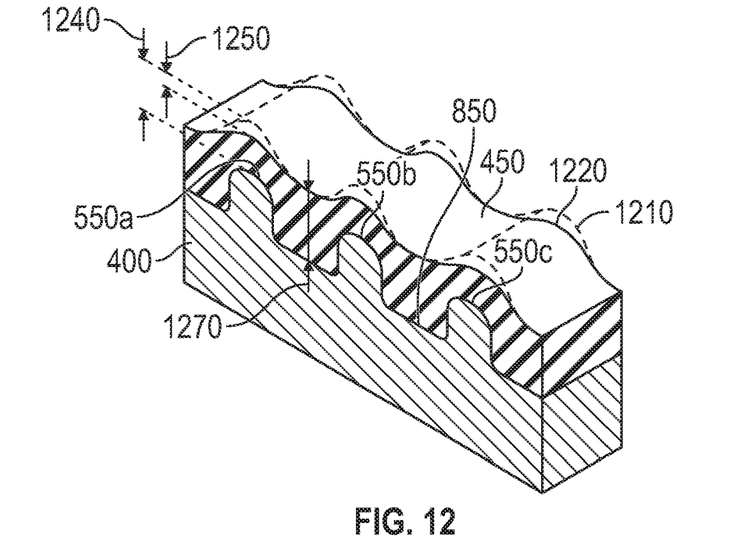
FIG. 12 is a detail sectional perspective view of the ridges of FIG. 11 in an encapsulated state, where an elastomer material is molded to a face surface of the valve plug defining the ridges and an exposed surface of the elastomer material is compressed.

As shown in FIG. 12, the coating 450 can be compressed from a uncompressed condition 1210 to a compressed condition 1220. The presence of the ridges 550a,b,c can effectively increase a degree of compression (as a percentage) of the coating 450 and therefore a contact force acting on the ridges 550a,b,c and the seat 150 (shown in FIG. 3). It can do this be decreasing a thickness of the coating 450 at the ridges 550a,b,c. By decreasing the thickness of the coating 450 at the ridges, the degree of compression of the coating at the ridges 550a,b,c—a compression distance 1250, as shown, divided by an original thickness 1240 of the coating 450—will be greater than the degree of compression of the coating between or away from the ridges 550a,b,c—the compression distance 1250 divided by a thickness 1270 of the coating 450 in the valley 850. The greater the degree (i.e., percentage) of compression given a particular material for the coating 450, generally the greater the force exerted by the compressed coating on the seat 150. Compression of the coating 450 at the ridges 550a,b,c can effectively produce "formation ridges" expressing a greater compression force and therefore creating a tighter or stronger seal against the seat 150. The existence of these formation ridges can be proven by finite element analysis (FEA), and use of the ridges disclosed herein has resulted in satisfactory leak check test results. In some aspects in which the coating 450 contacts the seat 150 at only the ridges, a thickness of the coating 450 such as the thickness 1270 can be increased or decreased as desired without directly impacting how the coating 450 interacts with the seat 150.

In some aspects, a thickness of the coating 450 such as the thickness 1240 or the thickness 1270 can measure ⅛ inch (approximately 3.2 millimeters) all around. In other aspects, the thickness 1240, 1270 can measure more than ⅛ inch (approximately 3.2 millimeters) all around. In other aspects, the thickness 1240, 1270 can measure less than ⅛ inch (approximately 3.2 millimeters) all around. In other aspects, as noted above, either of the thickness 1240 and the thickness 1270 can vary across the surface of the plug 300. In some aspects, the thickness 1240 can be one half of the thickness 1270. In other aspects, the thickness 1240 can be one third of the thickness 1270. In other aspects, the thickness 1240 can be between one half and one third of the thickness 1270. In other aspects, the thickness 1240 can be less than one half or greater than one third of the thickness 1270. As shown, the ridges 550a,b,c need not have outer surfaces or side surfaces that are angled.

As shown in FIGS. 13-16, the plug 300 can contact the seat 150 in a closed position and can rotate clear of the seat 150 towards an open position as shown in FIG. 13. As described above and shown in FIGS. 13 and 14, the thickness 1240 of the coating 450 can be substantially constant. As shown, the web 400 of the plug 300 can be configured to block passage of a fluid through the inlet 115 of the valve 100 when in the closed position. The face surface 401 can face the seat surface 151 of the valve body 110 in the closed position of the valve 100. An open angle 1310 measured between a centerline of the plug 300 in the open position and a centerline of the plug 300 in the closed position can measure 90 degrees.

As described above and shown in FIGS. 15 and 16, the thickness 1240 of the coating 450 can be substantially constant except at the ridges 550a,b, where the coating 450 can be thinner. More specifically, the thickness 1240 of the coating along the ridges 550a,b can be thinner than the thickness 1270 at a position adjacent to the ridges 550a,b.

A typical plug valve relies on sealing between two smooth surfaces, each without any irregularity or mismatch: the seat surface 151 of the valve body 110 and the radially outer surface 401 of the plug 300. This configuration can require greater interference between the plug 300 and the seat 150 and result in greater seating torque. Use of one or more of the ridges 550a,b,c disclosed herein, can create improved sealing at the location of the ridges 550a,b,c for the reasons described and with the exemplary structures described herein, and this can be accomplished with less seating torque. A seal between the plug 300 and the seat 150 can effectively by "energized" or facilitated by the increased pressure at the ridges 550a,b,c but a decreased pressure overall between the plug 300 and the seat 150.

A method of using the valve 100 can comprise rotating the valve plug 300 of the valve 100 inside the valve body 110 of the valve 100. The method can further comprise contacting the seat 150 of the valve body 110 with the valve plug 300, the valve plug 300 comprising the ridge 550 extending radially outward with respect to the shaft axis 101 of the valve 100, the valve plug 300 contacting the seat 150 of the valve body 110 in a closed position of the valve 100. The method of contacting the seat 150 of the valve body 110 with a ridge 550 of the valve plug 300 can comprise contacting the seat 150 of the valve body 110 with the coating 450. The method of contacting the seat 150 of the valve body 110 with the valve plug 300 can comprise a contact force acting between the valve plug 300 and the seat 150 at any cross-section orthogonal to the ridge 550 reaching its maximum at the ridge 550.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A plug valve comprising:
a valve body defining an inlet, an outlet, an interior surface, and an interior cavity extending from the inlet to the outlet, the interior surface defining the interior cavity, the interior surface comprising a seat proximate to one of the inlet and the outlet, the seat defining a seat surface; and
a valve plug positioned inside the interior cavity and configured to rotate inside the interior cavity between an open position of the valve and a closed position of the valve, the valve plug comprising a web defining a ridge, the ridge defining a radially outermost portion of the valve plug with respect to an axis of the valve, the valve plug contacting the seat of the valve body in the closed position of the valve, the web comprising a coating on a radially outer surface of the web, a thickness of the coating along the ridge being equal to or less than a thickness of the coating at a position adjacent to the ridge.

2. The valve of claim 1, wherein the web defines a face surface, the face surface defining the ridge, the face surface facing the seat surface of the valve body in the closed position of the valve.

3. The valve of claim 1, wherein the ridge extends at least partly in a radial direction away from the axis of the valve.

4. The valve of claim 1, wherein the ridge is a first ridge, the valve plug further comprising a second ridge, the second ridge positioned adjacent to the first ridge on the valve plug.

5. The valve of claim 1, wherein the valve plug further comprises an upper shaft, a lower shaft, and the web extending between the upper shaft and the lower shaft, each of the upper shaft and the lower shaft aligned along a shaft axis, the web being C-shaped, the ridge defined on a radially outer surface of the web, a tip of the ridge being round in cross-section.

6. The valve of claim 4, wherein the valve plug further comprises a third ridge, the third ridge positioned adjacent to the second ridge of the valve plug.

7. The valve of claim 1, wherein the coating comprises an elastomer material, the coating contacting the seat surface of the valve body in the closed position of the valve.

8. The plug valve of claim 1, wherein the valve plug comprises a monolithic web defining the ridge.

9. A valve plug comprising:
a shaft defining a shaft axis; and
a web extending from the shaft at least partly in a first direction parallel to the shaft axis and in a second direction orthogonal to the shaft axis, the web being C-shaped, each of a radially outer surface and a radially innermost surface of the web offset from the shaft axis at a midpoint of the web, a ridge extending from the radially outer surface of the web, the web configured to block passage of a fluid through a valve in a closed position of the valve, the web comprising a coating on the radially outer surface, the coating comprising an elastomer material, a thickness of the coating being thinner along the ridge than at a position adjacent to the ridge.

10. The valve plug of claim 9, wherein the radially outer surface of the web defines a radius in cross-section, the cross-section taken in a plane orthogonal to the shaft axis.

11. The valve plug of claim 9, wherein the web defines a web axis equidistant from a tip of each portion of the ridge in cross-section, the web axis being offset from the shaft axis.

12. The valve plug of claim 9, wherein the ridge extends at least partly in a radial direction away from the shaft axis, a tip of the ridge being round in cross-section.

13. The valve plug of claim 9, wherein the ridge is a first ridge, the web further comprising a second ridge, the second ridge positioned adjacent to and substantially parallel to the first ridge on the web.

14. The valve plug of claim 13, wherein a depth of a valley between the first ridge and the second ridge is less than a height of the first ridge and the second ridge, a tip of each of the first ridge and the second ridge being round in cross-section.

15. The valve plug of claim 13, wherein the valve plug further comprises a third ridge, the third ridge positioned adjacent to the second ridge of the valve plug, a tip of the third ridge being round in cross-section.

16. A method of using a valve, the method comprising:
rotating a valve plug of the valve inside a valve body of the valve, the valve body defining an inlet, an outlet, an interior surface, and an interior cavity extending from the inlet to the outlet, the interior surface defining the interior cavity, the interior surface comprising a seat proximate to one of the inlet and the outlet; and
contacting the seat of the valve body with the valve plug, the valve plug comprising a web defining a ridge extending radially outward with respect to an axis of the valve, the valve plug contacting the seat of the valve body in a closed position of the valve, the web comprising a coating on a radially outer surface of the web, a thickness of the coating along the ridge being equal to or less than a thickness of the coating at a position adjacent to the ridge.

17. The method of claim 16, wherein contacting the seat of the valve body with a ridge of the valve plug comprises contacting the seat of the valve body with the coating.

18. The method of claim 16, wherein the coating comprises an elastomer material.

19. The method of claim 17, wherein contacting the seat of the valve body with the valve plug comprises a contact force acting between the valve plug and the seat at any cross-section orthogonal to the ridge reaching its maximum at the ridge.

20. The method of claim 16, wherein the valve plug comprises a monolithic web defining the ridge.

\* \* \* \* \*